US009515947B1

(12) United States Patent
Lowe

(10) Patent No.: US 9,515,947 B1
(45) Date of Patent: Dec. 6, 2016

(54) METHOD AND SYSTEM FOR PROVIDING A VIRTUAL NETWORK-AWARE STORAGE ARRAY

(71) Applicant: EMC Corporation, Hopkinton, MA (US)

(72) Inventor: Scott Lowe, Castle Pines, CO (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 494 days.

(21) Appl. No.: 13/839,872

(22) Filed: Mar. 15, 2013

(51) Int. Cl.
*H04L 12/911* (2013.01)
*H04L 12/46* (2006.01)

(52) U.S. Cl.
CPC .......... *H04L 47/70* (2013.01); *H04L 12/4633* (2013.01); *H04L 12/4641* (2013.01)

(58) Field of Classification Search
CPC ................. H04L 12/4633; H04L 12/4641
See application file for complete search history.

(56) References Cited

U.S. PATENT DOCUMENTS

| 7,680,086 | B2 * | 3/2010 | Eglin ..................... G06Q 50/24 370/338 |
| 7,818,298 | B2 * | 10/2010 | Barker ............... G06F 17/30011 707/638 |
| 7,885,276 | B1 * | 2/2011 | Lin ..................... H04L 67/1002 370/401 |
| 8,019,812 | B2 * | 9/2011 | Janedittakarn .......... H04L 63/08 709/203 |
| 8,996,837 | B1 * | 3/2015 | Bono ..................... G06F 3/0689 711/114 |
| 9,008,085 | B2 * | 4/2015 | Kamble ................ G06F 13/385 370/389 |
| 9,087,322 | B1 * | 7/2015 | Graham .................. G06Q 10/10 |
| 9,112,769 | B1 * | 8/2015 | Fitzgerald ........... H04L 41/0213 |
| 9,128,622 | B1 * | 9/2015 | Yang ......................... G06F 9/50 |
| 2009/0288084 | A1 * | 11/2009 | Astete ................ G06F 9/45533 718/1 |
| 2011/0035494 | A1 * | 2/2011 | Pandey ................. G06F 9/5077 709/224 |
| 2012/0254445 | A1 * | 10/2012 | Kawamoto ........... G06F 9/5088 709/226 |
| 2012/0297381 | A1 * | 11/2012 | Ambat ................ G06F 9/45558 718/1 |
| 2013/0073894 | A1 * | 3/2013 | Xavier ............... G06F 11/2092 714/4.2 |

(Continued)

OTHER PUBLICATIONS

Mahalingam, M., et al., "VXLAN: A Framework for Overlaying Virtualized Layer 2 Networks over Layer 3 Networks draft-mahalingam-dutt-dcops-vxlan-03.txt," Network Working Group, Internet Draft, Feb. 2013, pp. 1-22.

(Continued)

*Primary Examiner* — Lashonda Jacobs
(74) *Attorney, Agent, or Firm* — Dergosits & Noah LLP; Todd A. Noah

(57) ABSTRACT

A multi-tenant virtual network-aware storage array device is disclosed and includes a storage array manager component for storing and managing data associated with a plurality of tenants. The storage array manager component is configured to provide a plurality of storage entities, where each of the plurality of storage entities is associated with a tenant of the plurality of tenants. The storage array manager component generates a virtual network instance ("VNI") for a first tenant, where the VNI is associated with a first storage entity and with a virtual network identifier ("VNID") identifying the VNI. In addition, a virtual network tunnel endpoint ("VTEP") for the VNI is generated. The storage array manager component encapsulates content relating to the first storage entity with the VNID for presentation to a first tenant system of the first tenant over a transport network via the VTEP.

20 Claims, 5 Drawing Sheets

(56) References Cited

U.S. PATENT DOCUMENTS

| | | | | |
|---|---|---|---|---|
| 2013/0191257 | A1* | 7/2013 | Koodli | H04L 12/4633 705/34 |
| 2013/0318219 | A1* | 11/2013 | Kancherla | H04L 49/70 709/222 |
| 2013/0322443 | A1* | 12/2013 | Dunbar | H04L 12/185 370/390 |
| 2013/0322446 | A1* | 12/2013 | Biswas | H04L 12/4633 370/392 |
| 2014/0006585 | A1* | 1/2014 | Dunbar | H04L 41/00 709/223 |
| 2014/0071983 | A1* | 3/2014 | Banavalikar | H04L 45/72 370/389 |
| 2014/0086253 | A1* | 3/2014 | Yong | H04L 12/4633 370/395.53 |
| 2014/0208317 | A1* | 7/2014 | Nakagawa | G06F 9/45533 718/1 |
| 2014/0215590 | A1* | 7/2014 | Brand | H04L 67/1097 726/6 |
| 2014/0258485 | A1* | 9/2014 | Yang | H04L 41/12 709/223 |
| 2014/0331337 | A1* | 11/2014 | Factor | G06F 21/62 726/30 |
| 2014/0337497 | A1* | 11/2014 | Wanser | H04L 41/0866 709/223 |
| 2015/0036538 | A1* | 2/2015 | Masuda | H04L 45/38 370/254 |
| 2015/0172070 | A1* | 6/2015 | Csaszr | H04L 12/1863 370/218 |
| 2015/0195178 | A1* | 7/2015 | Bhattacharya | H04L 43/106 718/1 |
| 2015/0271067 | A1* | 9/2015 | Li | H04L 45/50 370/392 |
| 2015/0355934 | A1* | 12/2015 | Yin | G06F 9/45558 718/1 |
| 2015/0381495 | A1* | 12/2015 | Cherian | H04L 45/745 370/392 |

OTHER PUBLICATIONS

Lasserre, M., et al., "Framework for DC Network Virtualization draft-ietf-nvo3-framework-01.txt," Internet Engineering Task Force, Internet Draft, Oct. 2012, pp. 1-25, Mountain View, CA, USA.

* cited by examiner

METHOD AND SYSTEM FOR PROVIDING A VIRTUAL NETWORK-AWARE STORAGE ARRAY

BACKGROUND

In a multi-tenant computing environment, hardware and software resources are shared among numerous entities known as tenants. Tenants can be independent customers, enterprises, and/or departments in an enterprise, and each tenant can be associated with one or many tenant systems that enable a user associated with the tenant to access the resources of the multi-tenant computing environment. For example, a tenant system can be a physical or virtual computer system or any other physical or virtual client device associated with the tenant. Resources, e.g., services and/or applications, can be provided on demand to multiple tenants over the same physical infrastructure. Moreover, network traffic relating to a tenant can be segregated and isolated from network traffic relating to another tenant by utilizing virtual local area networks ("VLANs") for each tenant. Accordingly, a tenant can be assigned its own VLAN over the physical infrastructure, i.e., a transport network, and its network traffic can be directed only to tenant systems belonging to the assigned VLAN.

Most multi-tenant computing environments can provide shared storage array devices for storing and managing the data of tenants of the multi-tenant computing environment. The shared storage array device can logically partition the storage array into storage entities for segregating and storing data associated with the tenants. Each storage entity can be configured to be a different type of storage construct according to the tenant's preferences. For example, a first storage entity can be configured to be a file system, a second storage entity can be configured to be an NFS export, and a third storage entity can be configured to be a logical unit number ("LUN"). The shared storage array device can support VLANs and thus can associate each storage entity with the VLAN associated with the tenant to which the storage entity is related. In this manner, data belonging to a particular tenant can be transmitted from the storage array device to a tenant system of the tenant only over the VLAN associated with the particular tenant. Similarly, the shared storage array device can receive data from the tenant system over the VLAN and store the data only in the storage entity associated with the tenant.

Utilizing VLANs to segregate network traffic between tenants in the multi-tenant computing environment is advantageous because multiple virtual networks can be implemented over a common transport network. Nevertheless, because VLANs are Layer 2 networks that utilize a 12 bit address identifier, the number of VLANs that can be implemented in a given environment cannot exceed approximately 4000. With the growing adoption of virtualization and multi-tenant cloud computing, this limit can easily be exceeded. Moreover, network traffic over a VLAN is not isolated across the transport network. As a result, a tenant's network traffic can potentially be viewed by a tenant system associated with another tenant.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

Figure 1:
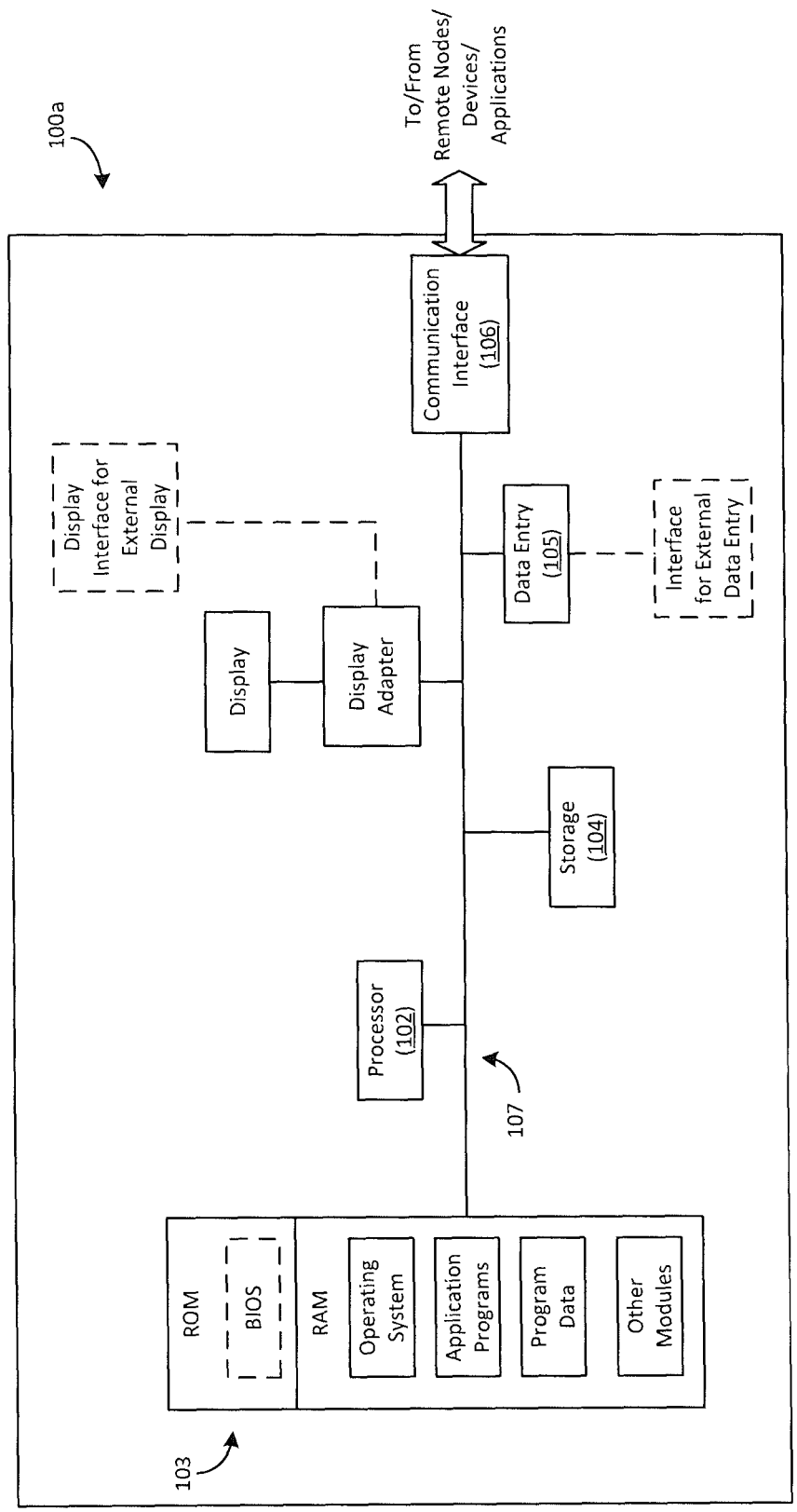
FIG. 1 is a block diagram illustrating an exemplary hardware device in which the subject matter may be implemented.

The subject matter presented herein is directed to a virtual overlay network-aware storage array device that supports a network virtualization overlay protocol to communicate with other network virtualization overlay-aware tenants in a multi-tenant computing environment. In the Internet Draft of the IETF entitled, "Framework for DC Network Virtualization," by Lasserre et al., Oct. 19, 2012 (http://www.ietf.org/internet-drafts/draft-ietf-nvo3-framework-01.txt), a framework for data center network virtualization over Layer 3 ("L3") tunnels is described. According to this document, the overlay network is a layer of virtual network topology on top of the physical network. Network Virtualization Edge ("NVE") nodes are entities that sit on the edge of the virtual overlay network and provide logical interconnects between tenant systems that belong to a specific tenant network.

According to the framework, a tenant system is attached to a NVE node locally, i.e., the NVE node and the tenant system reside in the same physical device, or remotely, via a point-to-point connection or a switched network. Depending on a network's configuration, the NVE node can be implemented on virtual and/or physical entities. For example, when the tenant system is a virtual machine, the NVE node can be implemented on a virtual switch and/or on a hypervisor, in which case, the NVE node and the tenant system reside on the same physical device. In another case, when the tenant system is a physical device, such as a server or a client computer, the NVE node can be implemented on a network switch.

In the framework, the NVE node enables network virtualization functions that allow for Layer 2 ("L2") and/or L3 tenant separation and for hiding tenant addressing information (MAC and IP addresses), tenant-related control plane activity, and service contexts from the Routed Backbone nodes. The NVE node includes at least one Virtual Network Instance ("VNI"), and an overlay manager component. The VNI is an instance of a virtual overlay network for a tenant. It represents a set of configuration attributes defining access and tunnel policies and forwarding functions for the tenant. Each tenant is associated with a VNI, which itself can be identified by a unique identifier ("VNID"). The tenant systems of a tenant are connected to the associated VNI in the NVE node through physical or virtual ports identified through logical interface identifiers. Because the NVE node can include more than one VNI, tenant systems of more than one tenant can be connected to the NVE node.

The NVE node's overlay manager component provides tunneling overlay functions for the tenant system(s) connected to the NVE node. When a frame packet is transmitted from a tenant system connected to a source NVE node to another tenant system connection to a destination NVE node over the virtual overlay network, the overlay manager component in the source NVE is configured to add the VNID for the VNI to the frame; and to use an L3 tunnel encapsulation to transport the frame to the destination NVE. The backbone devices on the underlying transport network are unaware of the overlay packets and simply forward the frames based on the outer tunnel header.

In the overlay network framework, each tenant network is associated with a VNI, which can be identified by a 24 bit VNID, see e.g., Internet Draft of the IETF entitled, "VXLAN: A Framework for Overlaying Virtualized Layer 2 Networks over Layer 3 Networks," by Mahalingam et al., Feb. 22, 2013 (http://www.ietf.org/internet-drafts/draft-ma-halingam-dutt-dcops-vxlan-03.txt). Accordingly, nearly 16 million VNIs can be supported within a single administrative domain.

In the frameworks described in the above mentioned Internet Drafts, one or more tenant systems of a tenant are connected to an NVE node, which provides connectivity to other NVE nodes that are connected to other tenant systems of the tenant. In the frameworks, the physical storage array device(s) are physical tenant systems that are remotely connected to NVE nodes. When the storage array device is dedicated to a tenant, it can present the tenant's storage entity, e.g., a file system, to other tenant systems of the tenant via the NVE node connected to the storage array device and the NVE nodes connected to the respective tenant systems. When the storage array device is a physical resource that is shared among numerous tenants in a multi-tenant environment, however, storage entities of different tenants cannot be presented on a per-tenant basis.

To address this issue, in an embodiment, the storage array device can be configured to implement a local internal NVE node. As such, the physical storage array device sits on the edge of the virtual overlay network and implements network virtualization functions that allow for L2 and/or L3 tenant separation. By essentially becoming an NVE node, the storage array device becomes virtual overlay network-aware ("VN-aware") and can provide segregated storage services to the up to 16 million tenants of the virtual overlay network. In an embodiment, network traffic transmitted from and received by the VN-aware storage array device is encapsulated across the transport network between the VN-aware storage array device and the tenant systems of the VN-aware tenants. Accordingly, a storage entity associated with a first tenant can be encapsulated for presentation to the first tenant's tenant systems, and a storage entity associated with a second tenant can be encapsulated for presentation to the second tenant's tenant systems.

Prior to describing the subject matter in detail, an exemplary hardware device in which the subject matter may be implemented is described. Those of ordinary skill in the art will appreciate that the elements illustrated in FIG. 1 may vary depending on the system implementation. With reference to FIG. 1, an exemplary system for implementing the subject matter disclosed herein includes a hardware device 100a, including a processing unit 102, memory 103, storage 104, data entry module 105, display adapter, communication interface 106, and a bus 107 that couples elements 103-106 to the processing unit 102.

The bus 107 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 103 and/or storage 104 and/or received via data entry module 105.

The memory 103 may include read only memory (ROM) and random access memory (RAM). Memory 103 may be configured to store program instructions and data during operation of device 100a. In various embodiments, memory 103 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example.

Memory 103 may also include nonvolatile memory technologies such as nonvolatile flash RAM (NVRAM) or ROM. In some embodiments, it is contemplated that memory 103 may include a combination of technologies such as the foregoing, as well as other technologies not specifically mentioned. When the subject matter is implemented in a computer system, a basic input/output system (BIOS), containing the basic routines that help to transfer information between elements within the computer system, such as during start-up, is stored in ROM.

The storage 104 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100a.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 104, ROM or RAM, including an operating system, one or more applications programs, program data, and other program modules. A user may enter commands and information into the hardware device 100a through data entry module 105. Data entry module 105 may include mechanisms such as a keyboard, a touch screen, a pointing device, etc. Other external input devices (not shown) are connected to the hardware device 100*a* via external data entry interface. By way of example and not limitation, external input devices may include a microphone, joystick, game pad, satellite dish, scanner, or the like. In some embodiments, external input devices may include video or audio input devices such as a video camera, a still camera, etc. Data entry module 105 may be configured to receive input from one or more users of device 100*a* and to deliver such input to processing unit 102 and/or memory 103 via bus 107.

A display is also connected to the bus 107 via display adapter. Display may be configured to display output of device 100*a* to one or more users. In some embodiments, a given device such as a touch screen, for example, may function as both data entry module 105 and display. External display devices may also be connected to the bus 107 via external display interface. Other peripheral output devices, not shown, such as speakers and printers, may be connected to the hardware device 100*a*.

The hardware device 100*a* may operate in a networked environment using logical connections to one or more remote nodes (not shown) via communication interface 106. The remote node may be another computer, a server, a router, a peer device or other common network node, and typically includes many or all of the elements described above relative to the hardware device 100*a*. The communication interface 106 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 106 may include logic configured to support direct memory access (DMA) transfers between memory 103 and other devices.

In a networked environment, program modules depicted relative to the hardware device 100*a*, or portions thereof, may be stored in a remote storage device, such as, for example, on a server. It will be appreciated that other hardware and/or software to establish a communications link between the hardware device 100*a* and other devices may be used.

It should be understood that the arrangement of hardware device 100*a* illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100*a*. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Figure 2:
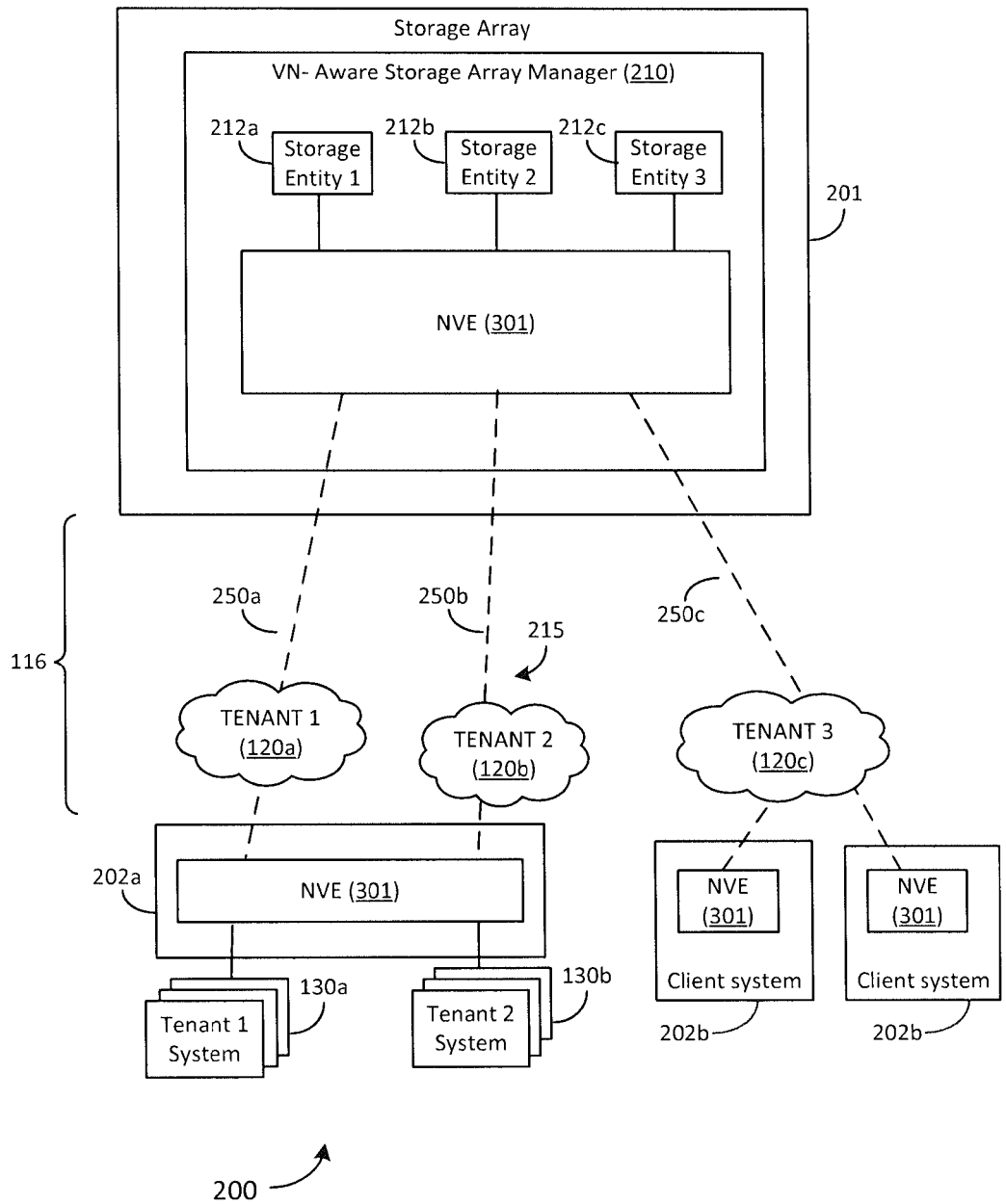
FIG. 2 is a block diagram representing a multi-tenant computing environment according to an embodiment.
Figure 3:
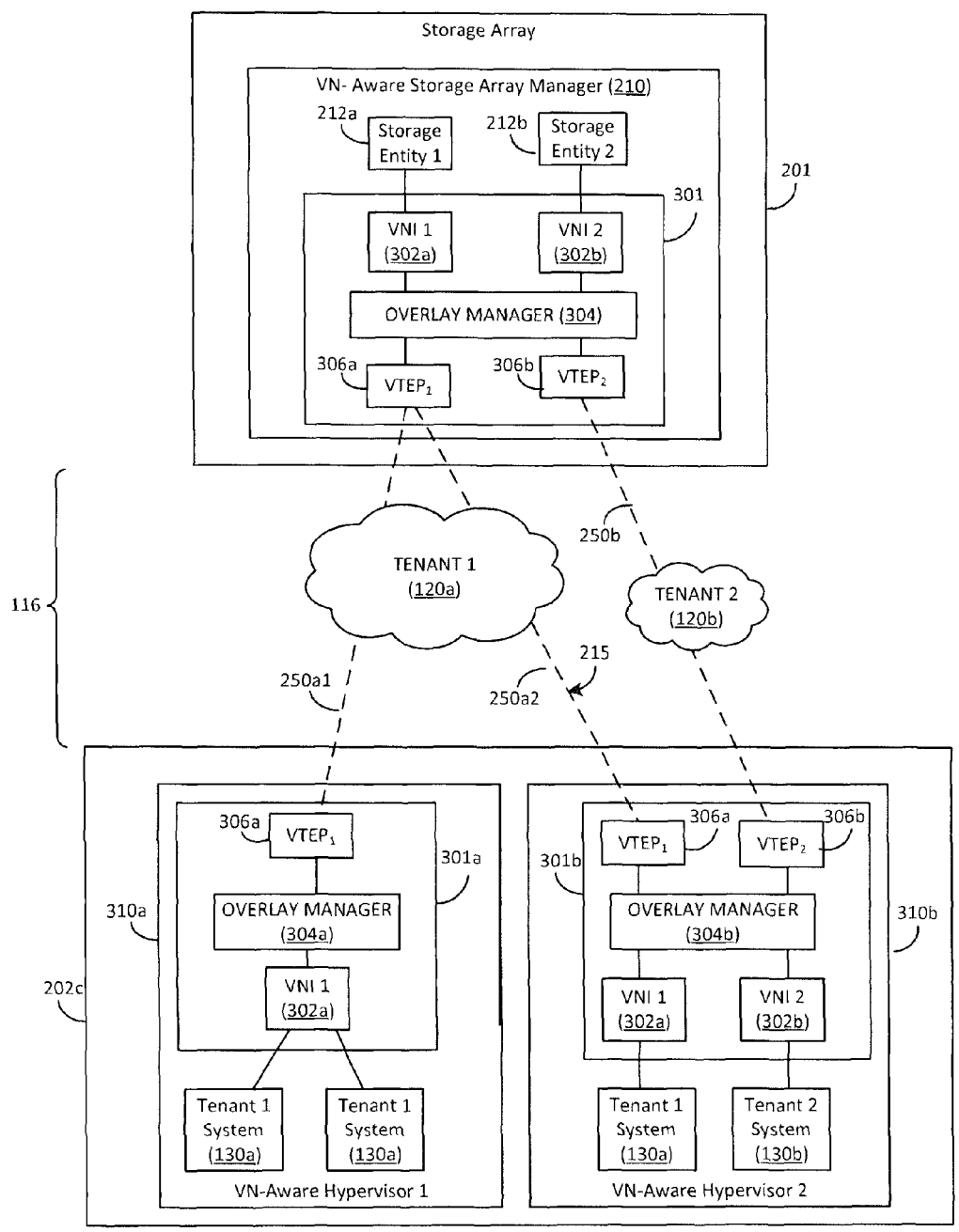
FIG. 3 is a block diagram representing a multi-tenant computing environment according to another embodiment.

FIG. 2 and FIG. 3 are block diagrams illustrating multi-tenant computing environments according to an embodiment of the subject matter described herein. As is shown, the multi-tenant computing environments 200, 300 include a storage array device 201 communicatively connected to at least one computer device 202*a*, 202*b*, 202*c* via a transport network 116. In an embodiment, the transport network 116 can be an underlay network over which the virtual overlay network is implemented.

The computer devices 202*a*, 202*b*, 202*c* can be any physical computer system connected to the underlying network and to which networking service is provided or facilitated. For example, in FIG. 2, a first computer device 202*a* can be a VN-aware switch that directs per-tenant traffic to tenant systems 130*a*, 130*b* of first 120*a* and second 120*b* tenants. In another embodiment, a second computer device 202*b* can be a VN-aware client system of a third tenant 120*c*. In FIG. 3, a third computer device 202*c* can be a server hosting first 310*a* and second 310*b* VN-aware hypervisors supporting virtual tenant systems 130*a*, 130*b* of the first 120*a* and the second 120*b* tenants. Such VN-aware hypervisors are commercially available, e.g., from VMware vSphere and Microsoft Hyper-V. In an embodiment, each computer device 202*a*-202*c* includes at least one NVE node, which can support at least one tenant, e.g., 120*a*, 120*b*, and can be configured to receive and transmit network traffic associated with the tenant systems of the at least one tenant over the transport network 116.

According to an embodiment, the storage array device 201 includes a VN-aware storage array manager component 210 that stores and manages data associated with plurality of tenants 120*a*-120*c* of the multi-tenant computing environment. The storage array manager component 210 is configured to logically partition the storage array so as to provide storage entities 212*a*-212*c* for segregating and presenting data associated with the tenants 120*a*-102*c*. As indicated above, the storage array manager 210 can configure each storage entity, e.g., 212*a*, to be a different type of storage construct according to the tenant's preferences. For example, a first storage entity 212*a* can be configured to be a file system, a second storage entity 212*b* can be configured to be an NFS export, and a third storage entity 212*c* can be configured to be a logical unit number ("LUN"). According to an embodiment, the VN-aware storage array manager component 210 can be configured to include an NVE node 301 to which the storage entities 212*a*-212*c* are connected. Thus, in an embodiment, the storage entities 212*a*-212*c* are tenant systems of the tenants 120*a*-102*c*.

The NVE node 301 of the storage array 201 can provide connectivity to other NVE nodes 301 that are connected, either directly or remotely, to other tenant systems 130*a*, 130*b*, 130*c* of the tenants 120*a*-102*c*. In an embodiment, the NVE nodes 301 of the various computer devices and/or virtual systems form logical tunnels 250*a*, 250*b*, 250*c* between themselves. While the NVE node 301 can support more than one tunnel, each tunnel, e.g, 250*a*, is associated with a tenant 120*a* and transmits network traffic associated with only that tenant 120*a* to and from tenant systems 130*a* of that tenant 120*a*.

Referring again to FIG. 3, the NVE node 301 of the storage array 201 is illustrated in more detail. In an embodiment, when storage entities 212*a*, 212*b* are provided, the storage array manager component 210 can generate corresponding VNIs 302*a*, 302*b* so that the storage entities 212*a*, 212*b* can be associated with their respective tenants 120*a*, 120*b*. For example, when a first storage entity, e.g., 212*a*, of a first tenant 120*a* is provided, the storage array manager 210 can be configured to generate a first VNI 302*a* associated with the first storage entity and with the first tenant 120*a*. Similarly, when a second storage entity, e.g., 212*b*, of a second tenant 120*b* is provided, the storage array manager 210 can be configured to generate a second VNI 302*b* associated with the second storage entity 212*b* and with the second tenant 120*b*.

In addition to generating the VNIs 302*a*, 302*b*, the storage array manager component 210 can also generate, in an embodiment, virtual network tunnel endpoints 306*a*, 306*b* ("VTEPs") for the VNIs 302*a*, 302*b* that are associated with tunnels 250*a*, 250*b* to other VTEPs in other NVE nodes 301*a*, 301*b*. According to an embodiment, because the tunnels 250*a*, 250*b* are associated with tenants 120*a*, 120*b*, the VTEPs 306*a*, 306*b* are also tenant specific and VNI specific. Thus, network traffic 215 leaving or entering a first tenant VTEP 306*a* of the first VNI 302*a* originates from the first storage entity 212*a* of the first tenant 120*a* or is received from another first tenant VTEP 306*a* associated with a tenant system 130*a* of the first tenant 120*a*.

In another embodiment, the storage array manager component 210 can also generate a shared VTEP (not shown) for the VNIs 302*a*, 302*b*. Because the shared VTEP services more than one VNI 302*a*, 302*b*, it can be associated with more than one tunnel 250*a*, 250*b*. According to an embodiment, the shared VTEP can be configured to receive tenant traffic from the VNIs 302*a*, 302*b* and to direct that traffic into the appropriate tunnel 250*a*, 250*b* based on the VNID associated with the traffic. Similarly, the shared VTEP can be configured to receive network traffic from tenant systems of multiple tenants 120*a*, 120*b* over multiple tunnels 250*a*, 250*b*, and can be configured, in an embodiment, to demultiplex the traffic based on the VNIDs associated with the various packets and to direct the traffic to the appropriate VNIs 302*a*, 302*b*.

According to an embodiment, a VTEP, e.g., 306*a*, can be associated with more than one tunnel 250*a*1, 250*a*2 for the tenant 120*a*. For example, when a first tenant system 130*a* of a first tenant 120*a* is connected to an NVE node 301*a* of a first hypervisor 310*a* and another tenant system 130*b* of the first tenant 120*a* is connected to another NVE node 301*b* of a second hypervisor 310*b*, the first tenant VTEP 306*a* in the storage array manager 301 can be an endpoint of two tunnels 250*a*1, 250*a*2 that are associated with the first tenant 120*a* but that originate from two separate NVEs 301*a*, 301*b*.

According to an embodiment, the NVE node 301 of the storage array also includes an overlay manager 304 that can encapsulate content relating to the any of storage entities 212*a*, 212*b* for presentation on a per-tenant basis. For example, the overlay manager component 304 can be configured to encapsulate content relating to the first storage entity 212*a* using the first VNID identifying the first VNI 302*a* so that the content can be presented to a first tenant system 130*a* of the first tenant 120*a* via the first VTEP 306*a*.

Encapsulation of the content can be performed in a number of ways to provide tunneling overlay functions. For example, in an embodiment, the above mentioned Internet Draft of the IETF entitled, "VXLAN: A Framework for Overlaying Virtualized Layer 2 Networks over Layer 3 Networks," by Mahalingam et al., Feb. 22, 2013 (http://www.ietf.org/internet-drafts/draft-mahalingam-dutt-dcops-vxlan-03.txt) describes a frame format for encapsulating content from a tenant system so that it can be tunneled over the transport network to a destination tenant system.

Figure 4:
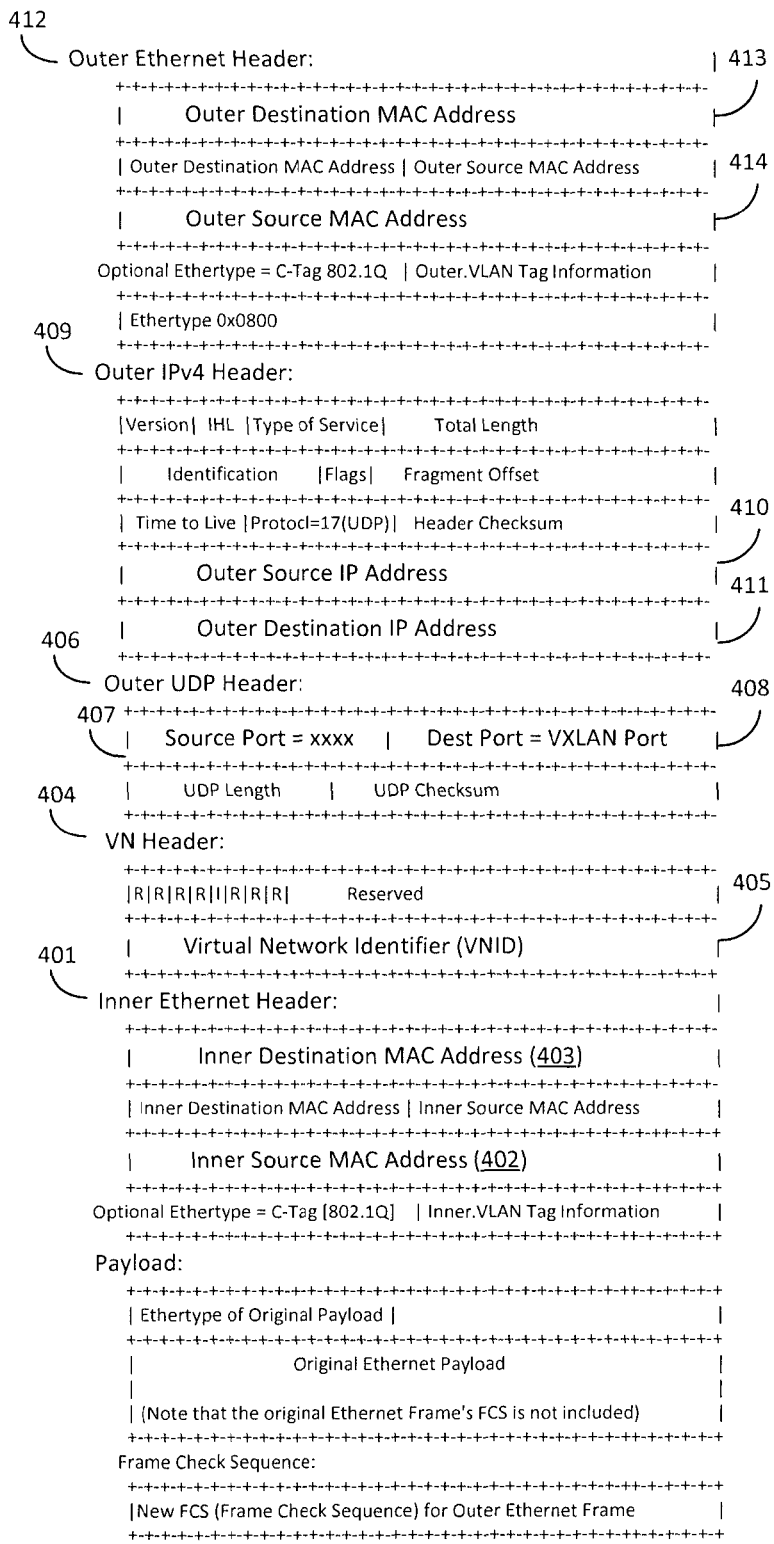
FIG. 4 is a block diagram illustrating a frame format that can be used to encapsulate content according to an embodiment.

FIG. 4 is a diagram illustrating the frame format 400 according to an embodiment. As is shown, the content/payload can be included in an inner MAC frame having an Inner Ethernet Header 401 with fields for Inner Source 402 and Inner Destination 403 MAC addresses. In an embodiment, when the source of the content is the first storage entity 212*a*, the inner source MAC address 402 can be associated with the first storage entity. Similarly, when the destination tenant system is a virtual machine, the inner destination MAC address 403 can be associated with the virtual machine. The inner MAC frame is encapsulated with four (4) outer headers, from the innermost header:

(1) a Virtual Network Header 404 including a field for the VNID 405;

(2) an Outer UDP Header 406 with fields for a source port 407 of the storage array's VTEP associated with the VNID and a destination port 408 of the computer device's VTEP associated with the destination tenant system;

(3) an Outer IP Header 409 with an outer source IP address field 410 for the storage array device's VTEP and an outer destination IP address field 411 for the computer device's VTEP; and (4) an Outer Ethernet Header 412 with an outer destination MAC address field 413 for the MAC address of the destination computer device's VTEP and a source destination MAC address field 414 for the MAC address of the storage array device's VTEP.

According to an embodiment, by providing the virtual network header 404 and the VNID 405 to encapsulate the content, overlapping per-tenant addresses are allowed without affecting network traffic 215 isolation. For example, in FIG. 3, the inner MAC addresses 403 of the virtual tenant systems 130a of the first tenant 120a in the first 310a and second 310b hypervisors are non-overlapping, i.e., they are unique within the first tenant 120a. Nonetheless, in the second hypervisor 310b, the inner MAC address 403 of the virtual tenant system 130a of the first tenant 120a may overlap with, i.e., be identical to, the inner MAC address 403 of the virtual tenant system 130b of the second tenant 120b. Accordingly, the first tenant 120a can be free to assign MAC and IP addresses to its virtual tenant systems 130a without regard to the addressing schemes of the second tenant 120b.

In an embodiment, the storage array device 201 can also receive encapsulated content from a tenant system of a tenant, e.g., the first tenant 120a, for storing in the storage entity 212a associated with the tenant 120a. In this case, when the encapsulated content is received, the overlay manager 304 can decapsulate the content by removing the Outer Ethernet Header 412, the Outer IP Header 409, and the Outer UDP Header 406 to reveal the Virtual Network Header 404 and the VNID 405. Based on the VNID, the VNI, e.g., 302a, associated with the tenant 120a can be identified. In an embodiment, the Virtual Network Header 404 can be removed to reveal the inner destination MAC address 403 of the storage entity 212a associated with the VNI 302a and the content can be forwarded to the storage entity 212a for storage.

Figure 5:
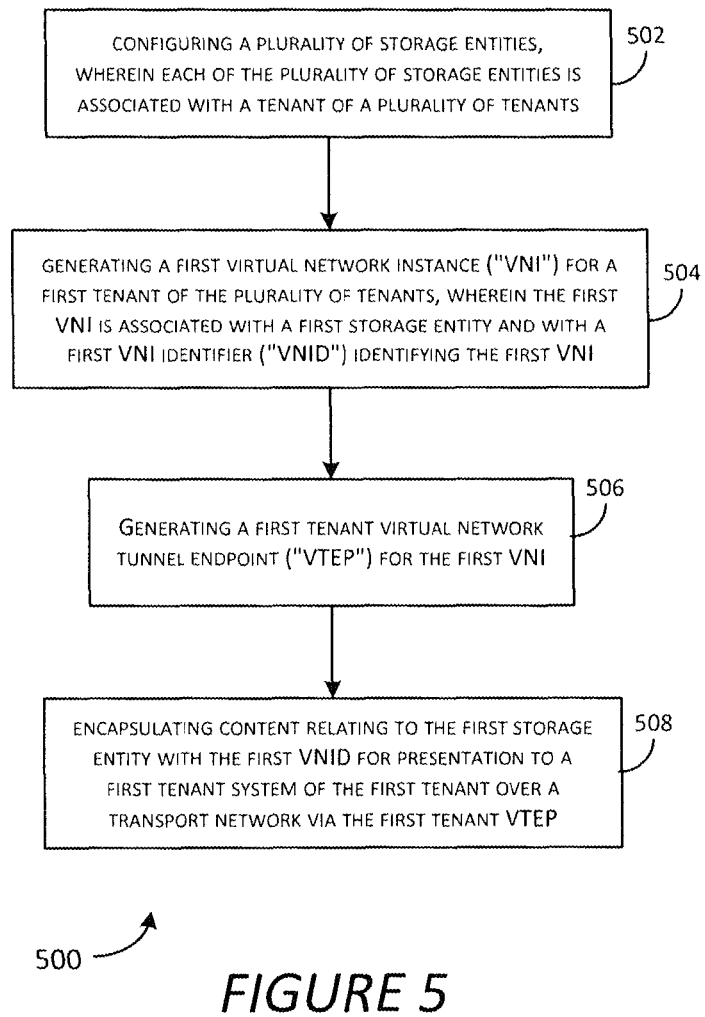
FIG. 5 is a flow diagram illustrating an exemplary method for providing a virtual network aware multi-tenant storage array device according to an embodiment.

Referring now to FIG. 5, a flow diagram is presented illustrating a method for providing a virtual overlay network-aware multi-tenant storage array according to an exemplary embodiment. Referring to FIG. 3 and FIG. 5, the method 500 begins at block 502 when a plurality of storage entities 212a, 212b are configured by the storage array manager component 210 in the storage array device 201. In an embodiment, each storage entity, e.g., 212a, is associated with a tenant 120a of the plurality of tenants 120a, 120b.

In block 504, the storage array manager component 210 generates a first VNI 302a for a first tenant 120a. In an embodiment, the first VNI 302a is associated with a first storage entity 212a of the first tenant 120a and with a first VNID identifying the first VNI 302a. In addition, in block 506, a first tenant VTEP 306a for the first VNI 302a is generated by the storage array manager component 210. Once the first VNI 302a and first tenant VTEP 306a are generated, the storage array manager component 210 can encapsulate content relating to the first storage entity 212a with the first VNID for presentation to a first tenant system 130a of the first tenant 120a over a transport network 116 via the first tenant VTEP 306a in block 508.

According to various embodiments, a VN-aware storage array device is provided in a multi-tenant computing environment that is implemented on a virtual overlay network. In an embodiment, VN-aware storage array device is configured to host a Network Virtualization Edge ("NVE") node so that network traffic between the storage array device and systems (physical or virtual) on the same virtual network instance ("VNI") of a tenant is encapsulated and isolated from the systems of other tenants on another VNI. Accordingly, the VN-aware storage array device can independently present storage entities on a per-virtual network basis so that a first system on a first VNI of a first tenant is presented with a first storage entity of the first tenant, and a second system on a second VNI of a second tenant is presented with a second storage entity of the second tenant.

By embracing network virtualization overlay protocols such that the storage array device becomes an NVE node, the VN-aware storage array device can fully communicate with multiple virtual networks natively. As such, the storage array device can avoid the restrictions inherent with the use of VLANs and can be afforded greater flexibility in the placement and use of IP storage protocols.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A multi-tenant storage array device comprising:
   a processor-based storage array manager component executed on a computer for storing and managing data associated with a plurality of tenants, wherein the storage array manager component is configured to:
      provide a plurality of storage entities on the storage array device, wherein each of the plurality of storage entities is associated with a tenant of the plurality of tenants;
      generate, within a network virtualization edge (NVE) node of the storage array device, a virtual network instance ("VNI") for each storage entity of the plurality of storage entities, wherein the VNI includes a virtual network identifier ("VNID");
      generate, within the NVE node of the storage array device, a virtual network tunnel endpoint ("VTEP") for each storage entity of the plurality of storage entities, wherein the generated VTEP connects the corresponding generated VNI with one or more tenant side VNIs of one or more tenants associated with the storage entity, and wherein the generated VTEP connects the corresponding generated VNI with the one or more tenant side VNIs via one or more corresponding tenant side VTEPs; and encapsulate content relating to the storage entity with the VNID for presentation to a tenant system of the tenant associated with the storage entity over a transport network via the generated VTEP.

2. The device of claim 1 wherein the storage array device is communicatively connected via the transport network to a computer device associated with the tenant system of the first tenant, wherein the computer device includes a tenant side VTEP associated with the generated VNI, and wherein when the encapsulated content is presented by the storage array device to the computer device through a first tunnel between the VTEP generated for the storage array device and the computer device's tenant side VTEP over the transport network, the content is forwarded to the tenant system.

3. The device of claim 1 wherein the storage entity is one of a file system, an NFS export, and a LUN.

4. The device of claim 2 wherein the generated VNI is a first VNI, the tenant is a first tenant, the storage entity is a first storage entity, the VNID is a first VNID, the generated VTEP is a first generated VTEP, and the tenant system is a first tenant system, the storage array manager component being further configured to:

generate, within the NVE node of the storage array device, a second VNI for a second tenant of the plurality of tenants, wherein the second VNI is associated with a second storage entity and includes a second VNID identifying the second VNI;

generate, within the NVE node of the storage array device, a second VTEP for the second VNI; and encapsulate content relating to the second storage entity with the second VNID for presentation to a second tenant system of the second tenant associated with the second storage entity over the transport network via the second generated VTEP, wherein the computer device is further associated with the second tenant system of the second tenant and further includes a second tenant side VTEP associated with the second generated VNI, and wherein when the encapsulated content relating to the second storage entity is received by the computer device through a second tunnel between the second VTEP generated for the storage array device and the computer device's second tenant side VTEP over the transport network, the content is forwarded to the second tenant system.

5. The device of claim 1 wherein the storage array manager component is further configured to:
receive content encapsulated with the first VNID;
decapsulate the content to determine the first VNID;
identify the VNI based on the VNID; and
forward the content to the storage entity associated with the VNI.

6. The device of claim 1 wherein the tenant system is associated with a computer device that includes a tenant side VTEP associated with the generated VNI, and wherein the storage array manager component is configured to encapsulate the content relating to the storage entity by:
including the content in an inner header that includes at least one of an inner source MAC address and an inner destination MAC address;

providing a first outer header including the VNID;
providing a second outer header including a source port of the storage array device's generated VTEP and a destination port of the computer device's tenant side VTEP;
providing a third outer header including a source network address of the storage array device's generated VTEP and a destination network address of the computer device's tenant side VTEP; and
providing a fourth outer header including a destination MAC address of the computer device's tenant side VTEP and a source MAC address of the storage array device's generated VTEP.

7. The device of claim 6 wherein when the tenant system is a first virtual machine, the inner destination MAC address is associated with the first virtual machine.

8. The device of claim 6 wherein the inner source MAC address is associated with the storage entity.

9. The device of claim 4 wherein the storage array manager component is configured to:
encapsulate the content relating to the first storage entity by including the content in an inner header that includes a destination MAC address associated with the first tenant system, providing an outer header including the first VNID, and providing at least one other outer header including at least one of a destination network address and a destination MAC address of the computer device's first tenant side VTEP; and
encapsulate the content relating to the second storage entity by including the content in an inner header that includes a destination MAC address associated with the second tenant system, providing an outer header including the second VNID, and providing at least one other outer header including at least one of a destination network address and a destination MAC address of the computer device's second tenant side VTEP,
wherein the destination MAC address of the second tenant system and the destination MAC address of the tenant system overlap.

10. A non-transitory machine-readable medium carrying one or more sequences of instructions for providing a virtual network aware multi-tenant storage array device for storing and managing data associated with a plurality of tenants, which instructions, when executed by one or more processors in the storage array, cause the one or more processors to carry out a method comprising:

configuring, in a storage array device, a plurality of storage entities, wherein each of the plurality of storage entities is associated with a tenant of a plurality of tenants;

generating, within a network virtualization edge (NVE) node of the storage array device, a virtual network instance ("VNI") for each storage entity of the plurality of storage entities, wherein the VNI includes a virtual network identifier ("VNID");

generating, within the NVE node of the storage array device, a virtual network tunnel endpoint ("VTEP") for each storage entity of the plurality of storage entities, wherein the generated VTEP connects the corresponding generated VNI with one or more tenant side VNIs of one or more tenants associated with the storage entity, and wherein the generated VTEP connects the corresponding generated VNI with the one or more tenant side VNIs via one or more corresponding tenant side VTEPs; and encapsulating, by the storage array device, content relating to the storage entity with the VNID for presentation to a tenant system of the first tenant associated with the storage entity over a transport network via the generated VTEP.

11. A method for providing a virtual network aware multi-tenant storage array device, the method comprising:
configuring, by a storage array manager component in a storage array device for storing and managing data associated with a plurality of tenants, a plurality of storage entities, wherein each of the plurality of storage entities is associated with a tenant of a plurality of tenants;
generating, by the storage array manager component within a network virtualization edge (NVE) node of the storage array device, a first virtual network instance ("VNI") for each storage entity of the plurality of storage entities, wherein the VNI includes a virtual network identifier ("VNID");
generating, by the storage array manager component within the NVE node of the storage array device, a virtual network tunnel endpoint ("VTEP") for each storage entity of the plurality of storage entities, wherein the generated VTEP connects the corresponding generated VNI with one or more tenant side VNIs of one or more tenants associated with the storage entity, and wherein the generated VTEP connects the corresponding generated VNI with the one or more tenant side VNIs via one or more corresponding tenant side VTEPs; and
encapsulating, by the storage array manager component, content relating to the storage entity with the VNID for presentation to a tenant system of the tenant associated with the storage entity over a transport network via the generated VTEP.

12. The method of claim 11 wherein the storage array device is communicatively connected via the transport network to a computer device associated with the tenant system of the tenant, wherein the computer device includes a tenant side VTEP associated with the generated VNI, and wherein when the encapsulated content is presented by the storage array device to the computer device through a first tunnel between the VTEP generated for the storage array device and the computer device's tenant side VTEP over the transport network, the content is forwarded to the tenant system.

13. The method of claim 11 wherein the storage entity is one of a file system, an NFS export, and a LUN.

14. The method of claim 12 wherein the generated VNI is a first VNI, the tenant is a first tenant, the storage entity is a first storage entity, the VNID is a first VNID, the generated VTEP is a first generated VTEP, and the tenant system is a first tenant system, the method further comprising:
generating, by the storage array manager component within the NVE node of the storage array device, a second VNI for a second tenant of the plurality of tenants, wherein the second VNI is associated with a second storage entity and includes a second VNID identifying the second VNI;
generating, by the storage array manager component within the NVE node of the storage array device, a second VTEP for the second VNI; and
encapsulating, by the storage array manager component, content relating to the second storage entity with the second VNID for presentation to a second tenant system of the second tenant associated with the second storage entity over the transport network via the second tenant generated VTEP,
wherein the computer device is further associated with the second tenant system of the second tenant and further includes a second tenant side VTEP associated with the second generated VNI, and wherein when the encapsulated content relating to the second storage entity is presented to the computer device through a second tunnel between the second tenant VTEP generated for the storage array device and the computer device's second tenant side VTEP over the transport network, the content is forwarded to the second tenant system.

15. The method of claim 11 further comprising:
receiving content encapsulated with the VNID;
decapsulating the content to determine the first VNID;
identifying the VNI based on the VNID; and
forwarding the content to the storage entity associated with the VNI.

16. The method of claim 11 wherein the tenant system is associated with a computer device that includes a tenant side VTEP associated with the generated VNI, and wherein the encapsulating the content relating to the storage entity comprises:
including the content in an inner header that includes at least one of an inner source MAC address and an inner destination MAC address;
providing a first outer header including the VNID;
providing a second outer header including a source port of the storage array device's generated VTEP and a destination port of the computer device's tenant side VTEP;
providing a third outer header including a source network address of the storage array device's tenant generated VTEP and a destination network address of the computer device's tenant side VTEP; and
providing a fourth outer header including a destination MAC address of the computer device's tenant side VTEP and a source MAC address of the storage array device's generated VTEP.

17. The method of claim 16 wherein when the tenant system is a first virtual machine, the inner destination MAC address is associated with the virtual machine.

18. The method of claim 16 wherein the inner source MAC address is associated with the storage entity.

19. The method of claim 14 further comprising:
encapsulating the content relating to the storage entity by including the content in an inner header that includes a destination MAC address associated with the tenant system, providing an outer header including the VNID, and providing at least one other outer header including at least one of a destination network address and a destination MAC address of the computer device's tenant side VTEP; and
encapsulating the content relating to the second storage entity by including the content in an inner header that includes a destination MAC address associated with the second tenant system, providing an outer header including the second VNID, and providing at least one other outer header including at least one of a destination network address and a destination MAC address of the computer device's second tenant side VTEP,
wherein the destination MAC address of the second tenant system and the destination MAC address of the tenant system overlap.

20. The method of claim 12 wherein when the storage array device is communicatively connected via the transport network to a second computer device that includes another tenant side VTEP and is associated with another tenant system, the method further comprises presenting the encapsulated content relating to the storage entity to the tenant system associated with the second computer device via a second tunnel between the VTEP generated for the storage array device and the second computer device's tenant side VTEP.

* * * * *